(12) United States Patent
Boffa et al.

(10) Patent No.: US 10,697,857 B2
(45) Date of Patent: Jun. 30, 2020

(54) METHOD AND APPARATUS FOR CHECKING TYRES IN A PRODUCTION LINE

(71) Applicant: PIRELLI TYRE S.P.A., Milan (IT)

(72) Inventors: Vincenzo Boffa, Milan (IT); Valeriano Ballardini, Grigliasco (IT); Giuseppe Casadio Tozzi, Imola (IT); Bartolomeo Montrucchio, Turin (IT)

(73) Assignee: PIRELLI TYRE S.P.A., Milan (IT)

( * ) Notice: Subject to any disclaimer, the term of this patent is extended or adjusted under 35 U.S.C. 154(b) by 124 days.

(21) Appl. No.: 15/536,095

(22) PCT Filed: Dec. 14, 2015

(86) PCT No.: PCT/IB2015/059575
§ 371 (c)(1),
(2) Date: Jun. 14, 2017

(87) PCT Pub. No.: WO2016/103103
PCT Pub. Date: Jun. 30, 2016

(65) Prior Publication Data
US 2017/0350793 A1    Dec. 7, 2017

(30) Foreign Application Priority Data
Dec. 22, 2014 (IT) .............................. MI2014A2215

(51) Int. Cl.
*G01M 17/02* (2006.01)
*G01N 21/88* (2006.01)
(Continued)

(52) U.S. Cl.
CPC ...... *G01M 17/027* (2013.01); *G01N 21/8851* (2013.01); *G06K 9/4661* (2013.01);
(Continued)

(58) Field of Classification Search
CPC ......... B25J 9/1697; B41J 2/442; B60R 1/082; B60C 1811/2509; B60C 13/001;
(Continued)

(56) References Cited

U.S. PATENT DOCUMENTS 4,606,634 A    8/1986 Bieringer
4,634,879 A    1/1987 Penney
(Continued)

FOREIGN PATENT DOCUMENTS

CN    1624420 A    6/2005
CN    1849496 A    10/2006
(Continued)

OTHER PUBLICATIONS

International Search Report for International Application No. PCT/IB2015/059612 filed on Dec. 15, 2015 in the name of Pirelli Tyre S.P.A. dated Mar. 29, 2016. 4 pages.
(Continued)

*Primary Examiner* — Xuemei G Chen
(74) *Attorney, Agent, or Firm* — Steinfl + Bruno LLP

(57) ABSTRACT

A method and apparatus for checking tyres in a tyre production line. The method includes alternately illuminating, with a first and second grazing light radiation, a surface portion of the tyre and respectively acquiring a first and second two-dimensional digital image of the illuminated surface portion. For each point of the surface portion, the respective overall light power of the first and second light radiation incident at the point respectively comes from two half-spaces that are opposite with respect to an optical plane passing through the perpendicular to the surface at the point; and comparing the first and second image to obtain information on an altimetric profile of the surface portion.

20 Claims, 5 Drawing Sheets

(51) Int. Cl.
*G06K 9/46* (2006.01)
*G06T 7/00* (2017.01)
*H04N 5/225* (2006.01)

(52) U.S. Cl.
CPC ........... *G06T 7/001* (2013.01); *H04N 5/2256* (2013.01); *G01N 21/8806* (2013.01); *G06T 2207/10024* (2013.01); *G06T 2207/10028* (2013.01); *G06T 2207/10152* (2013.01); *G06T 2207/20224* (2013.01)

(58) Field of Classification Search
CPC .. B60C 19/00; G01M 17/027; G02B 13/0005; G02B 6/0028; G01J 1/429; G03B 15/07; G01N 21/359; G01N 21/8806; G01N 21/9515; G01N 21/95607; G01N 21/8851; G01N 21/952; G01N 21/954; F21V 13/02; H01L 31/02327; G06K 9/209; G06K 9/4661; G06T 7/001; G06T 2207/10024; G06T 2207/10028; G06T 2207/10152; G06T 2207/20224; H04N 5/2256; G01B 11/30; G01B 11/24; G01B 11/2509
USPC ....... 136/259; 204/462; 250/341.1; 347/258; 356/237.1, 611; 359/868; 362/19, 600; 382/106, 141, 144; 503/201
See application file for complete search history.

(56) References Cited

U.S. PATENT DOCUMENTS

| | | | | |
|---|---|---|---|---|
| 4,697,082 | A * | 9/1987 | Bartelsen | G01N 21/359 250/341.1 |
| 5,059,031 | A | 10/1991 | Hamel et al. | |
| 5,802,201 | A * | 9/1998 | Nayar | B25J 9/1697 382/106 |
| 5,987,978 | A | 11/1999 | Whitehead | |
| 6,327,374 | B1 | 12/2001 | Piironen et al. | |
| 6,603,874 | B1 * | 8/2003 | Stern | G01N 21/8806 382/144 |
| 6,680,471 | B2 | 1/2004 | Kokubu et al. | |
| 6,934,018 | B2 | 8/2005 | Shaw et al. | |
| 7,177,740 | B1 * | 2/2007 | Guangjun | G01C 1/06 356/139.09 |
| 7,421,108 | B2 * | 9/2008 | Kaneko | G01B 11/24 382/141 |
| 7,466,430 | B2 | 12/2008 | Braghiroli | |
| 7,495,231 | B2 * | 2/2009 | Truche | G03B 15/07 204/462 |
| 7,568,385 | B2 | 8/2009 | Maehner et al. | |
| 7,603,894 | B2 | 10/2009 | Breed | |
| 7,686,495 | B2 * | 3/2010 | Noba | G02B 6/0023 349/65 |
| 7,843,574 | B2 * | 11/2010 | Schmitt | G01B 11/2509 356/611 |
| 8,059,279 | B2 * | 11/2011 | Iino | G01N 21/9515 356/237.1 |
| 8,086,019 | B2 * | 12/2011 | Honda | B60C 13/001 382/141 |
| 8,752,423 | B2 | 6/2014 | Olivares et al. | |
| 8,824,878 | B2 * | 9/2014 | Mizukusa | G01M 17/027 396/19 |
| 8,948,491 | B2 * | 2/2015 | Sekiguchi | G01B 11/30 356/600 |
| 9,091,596 | B2 * | 7/2015 | Anderson | G01J 1/429 |
| 9,097,514 | B2 | 8/2015 | Takahashi et al. | |
| 9,109,974 | B2 * | 8/2015 | Takahashi | G01B 11/245 |
| 9,113,046 | B2 | 8/2015 | Fujii et al. | |
| 9,121,693 | B2 * | 9/2015 | Iwayama | B29D 30/3007 |
| 9,239,274 | B2 * | 1/2016 | Joly | G01M 17/027 |
| 9,310,278 | B2 * | 4/2016 | Sukegawa | G01B 11/24 |
| 9,546,963 | B2 | 1/2017 | Hwang et al. | |
| 9,618,425 | B2 * | 4/2017 | Clark | G01M 17/02 |
| 9,677,897 | B2 * | 6/2017 | Driscoll | G01C 21/26 |
| 9,704,237 | B2 * | 7/2017 | Araki | G01B 11/24 |
| 9,835,524 | B2 * | 12/2017 | Boffa | G01M 17/027 |
| 9,948,841 | B2 * | 4/2018 | Takahashi | G01B 11/25 |
| 10,118,448 | B2 * | 11/2018 | Mizutani | B60C 19/00 |
| 10,247,543 | B2 * | 4/2019 | Rhoades | G01B 11/22 |
| 10,313,574 | B2 * | 6/2019 | Hanel | G06K 9/209 |
| 2002/0009218 | A1 | 1/2002 | Chapman et al. | |
| 2003/0048352 | A1 * | 3/2003 | Kato | G02B 13/0005 347/258 |
| 2004/0212795 | A1 | 10/2004 | Steinbichler et al. | |
| 2005/0264796 | A1 | 12/2005 | Shaw et al. | |
| 2006/0083347 | A1 | 4/2006 | Nosekabel et al. | |
| 2007/0279931 | A1 * | 12/2007 | Bryan | G02B 6/0028 362/600 |
| 2008/0202229 | A1 | 8/2008 | Maehner et al. | |
| 2008/0214391 | A1 * | 9/2008 | Kawahara | B41J 2/442 503/201 |
| 2010/0002244 | A1 | 1/2010 | Lino et al. | |
| 2010/0180676 | A1 | 7/2010 | Braghiroli et al. | |
| 2011/0018999 | A1 | 1/2011 | Joly et al. | |
| 2011/0188731 | A1 | 8/2011 | Sekiguchi | |
| 2011/0228414 | A1 * | 9/2011 | Locatelli | B60R 1/082 359/868 |
| 2011/0288814 | A1 | 11/2011 | Mizutani et al. | |
| 2012/0008148 | A1 | 1/2012 | Pryce et al. | |
| 2012/0020526 | A1 | 1/2012 | Teti et al. | |
| 2012/0134656 | A1 | 5/2012 | Mizukusa et al. | |
| 2013/0104984 | A1 * | 5/2013 | Myrskog | H01L 31/02327 136/259 |
| 2014/0341460 | A1 * | 11/2014 | Ballabio | G01M 17/027 382/141 |
| 2015/0338066 | A1 * | 11/2015 | Al-Saud | F21V 13/02 362/19 |
| 2016/0258842 | A1 * | 9/2016 | Taylor | G01B 11/22 |
| 2016/0377556 | A1 | 12/2016 | Boffa et al. | |
| 2017/0030709 | A1 * | 2/2017 | Tanaka | G01B 11/24 |
| 2017/0160079 | A1 * | 6/2017 | Takebuchi | G01B 11/24 |
| 2017/0349007 | A1 * | 12/2017 | Wei | G01B 11/22 |
| 2017/0370807 | A1 | 12/2017 | Boffa et al. | |
| 2018/0172557 | A1 | 6/2018 | Ghidotti et al. | |
| 2018/0189939 | A1 | 7/2018 | Ghidotti et al. | |
| 2018/0266810 | A1 * | 9/2018 | Boffa | G01B 11/24 |
| 2018/0299352 | A1 | 10/2018 | Rose et al. | |
| 2018/0299353 | A1 | 10/2018 | Held et al. | |
| 2018/0328819 | A1 | 11/2018 | Boffa et al. | |
| 2018/0364134 | A1 | 12/2018 | Held et al. | |
| 2018/0372590 | A1 | 12/2018 | Held et al. | |
| 2018/0372592 | A1 | 12/2018 | Held et al. | |
| 2019/0017902 | A1 | 1/2019 | Held et al. | |
| 2019/0086293 | A1 | 3/2019 | Held et al. | |
| 2019/0145862 | A1 | 5/2019 | Boffa et al. | |

FOREIGN PATENT DOCUMENTS

| | | |
|---|---|---|
| CN | 101672627 A | 3/2010 |
| CN | 101896865 A | 11/2010 |
| CN | 102478527 A | 5/2012 |
| CN | 103038601 A | 4/2013 |
| CN | 103080693 A | 5/2013 |
| CN | 104251866 A | 12/2014 |
| DE | 19534716 A1 | 3/1997 |
| DE | 102007009040 B3 | 5/2008 |
| EP | 0785421 A2 | 7/1997 |
| EP | 1030173 A1 | 8/2000 |
| EP | 1120640 A1 | 8/2001 |
| EP | 1742041 A1 | 1/2007 |
| EP | 2078955 A1 | 7/2009 |
| EP | 2322899 A1 | 5/2011 |
| EP | 2172737 B1 | 4/2013 |
| EP | 1742041 B1 | 10/2013 |
| JP | H07237270 A | 9/1995 |
| JP | H09277806 A | 10/1997 |
| JP | 2005337957 A | 12/2005 |
| JP | 2007322402 A | 12/2007 |
| JP | 2011511932 A | 4/2011 |
| JP | 2012112838 A | 6/2012 |

(56) References Cited

FOREIGN PATENT DOCUMENTS

| JP | 2013242256 A | 12/2013 |
|---|---|---|
| WO | 2010/024254 A1 | 3/2010 |
| WO | 2014097133 A1 | 6/2014 |
| WO | 2015/004587 A1 | 1/2015 |

OTHER PUBLICATIONS

International Written Opinion for International Application No. PCT/IB2015/059612 filed on Dec. 15, 2015 in the name of Pirelli Tyre S.P.A. dated Mar. 29, 2016. 8 pages.
PCT International Search Report and Written Opinion for PCT/IB2015/059575 filed on Dec. 14, 2015 in the name of Pirelli Tyre S.P.A. dated Mar. 29, 2016.
International Search Report for International Application No. PCT/IB2016/057711 filed on Dec. 16, 2016 on behalf of Pirelli Tyre S.P.A. dated Mar. 20, 2017. 4 pages.
Non-Final Office Action for U.S. Appl. No. 15/535,303, filed Jun. 12, 2017, on behalf of Pirelli Tyre S.P.A. dated Jan. 24, 2019. 11 pages.
Non-Final Office Action for U.S. Appl. No. 16/060,707, filed Jun. 8, 2018 on behalf of Pirelli Tyre S.P.A dated May 24, 2019 17 pages.
Notice of Allowance for U.S. Appl. No. 15/535,303, filed Jun. 12, 2017 on behalf of Pirelli Tyre S.P.A.. dated May 24, 2019. 6 pages.
Written Opinion for International Application No. PCT/IB2016/057711 filed on Dec. 16, 2016 on behalf of Pirelli Tyre S.P.A. dated Mar. 20, 2017. 7 pages.
Japanese Notice of Reasons for Rejection for Japanese Application No. 2017-528989 filed on behalf of Pirelli Tyre S.P.A. dated Oct. 7, 2019 9 pages (English + Original).
Notice of Allowance for U.S. Appl. No. 15/535,303, filed Jun. 12, 2017 on behalf of Pirelli Tyre S.P.A. dated Aug. 28, 2019 11 pages.
First Chinese Office Action for Chinese Application No. 201680073691.5 filed on Dec. 16, 2016 on behalf of Pirelli Tyre S.P.A. dated Nov. 18, 2019 30 pages (English + Original).
Notice of Allowance for U.S. Appl. No. 15/535,303, filed Jun. 12, 2017, on behalf of Pirelli Tyre S.P.A. dated Nov. 19, 2019. 10 Pages.
Notice of Allowance for U.S. Appl. No. 16/060,707, filed Jun. 8, 2018 on behalf of Pirelli Tyre S.P.A. dated Nov. 21, 2019 11 pages.
Notice of Reasons for Rejection for Japanese Application No. 2017-529080 dated Oct. 25, 2019 (Japanese Orig + Engl Transl). 13 pages.
Second Chinese Office Action for Chinese Application No. 201580070116 filed on Dec. 15, 2015 on behalf of Pirelli Tyre S.P.A. dated Dec. 9, 2019 10 pages (English + Original).
Chinese Office Action for Chinese Application No. 201580070116.5 filed on behalf of Pirelli Tyre S.P.A. dated Mar. 29, 2019. 16 pages.
Chinese Office Action for Chinese Application No. 201580070170.X filed on behalf of Pirelli Tyre S.P.A. dated Apr. 10, 2019. 17 pages.
European Office Action for European Application No. 15828758.1 on behalf of Pirelli Tyre S.P.A. dated Nov. 16, 2018. 4 pages.
European Office Action for European Application No. 15828862.1 on behalf of Pirelli Tyre S.P.A. dated Nov. 14, 2018. 5 pages.
Japanese Notice of Reasons for Rejection for Japanese Application No. 2017-529080 filed on behalf of Pirelli Tyre S.P.A. dated Oct. 25, 2019. 13 pages.
Notice of Allowance for U.S. Appl. No. 15/535,503, filed Jun. 12, 2017 on behalf of PIRELLI TYRE S.P.A. dated Feb. 26, 2020. 10 pages.

\* cited by examiner

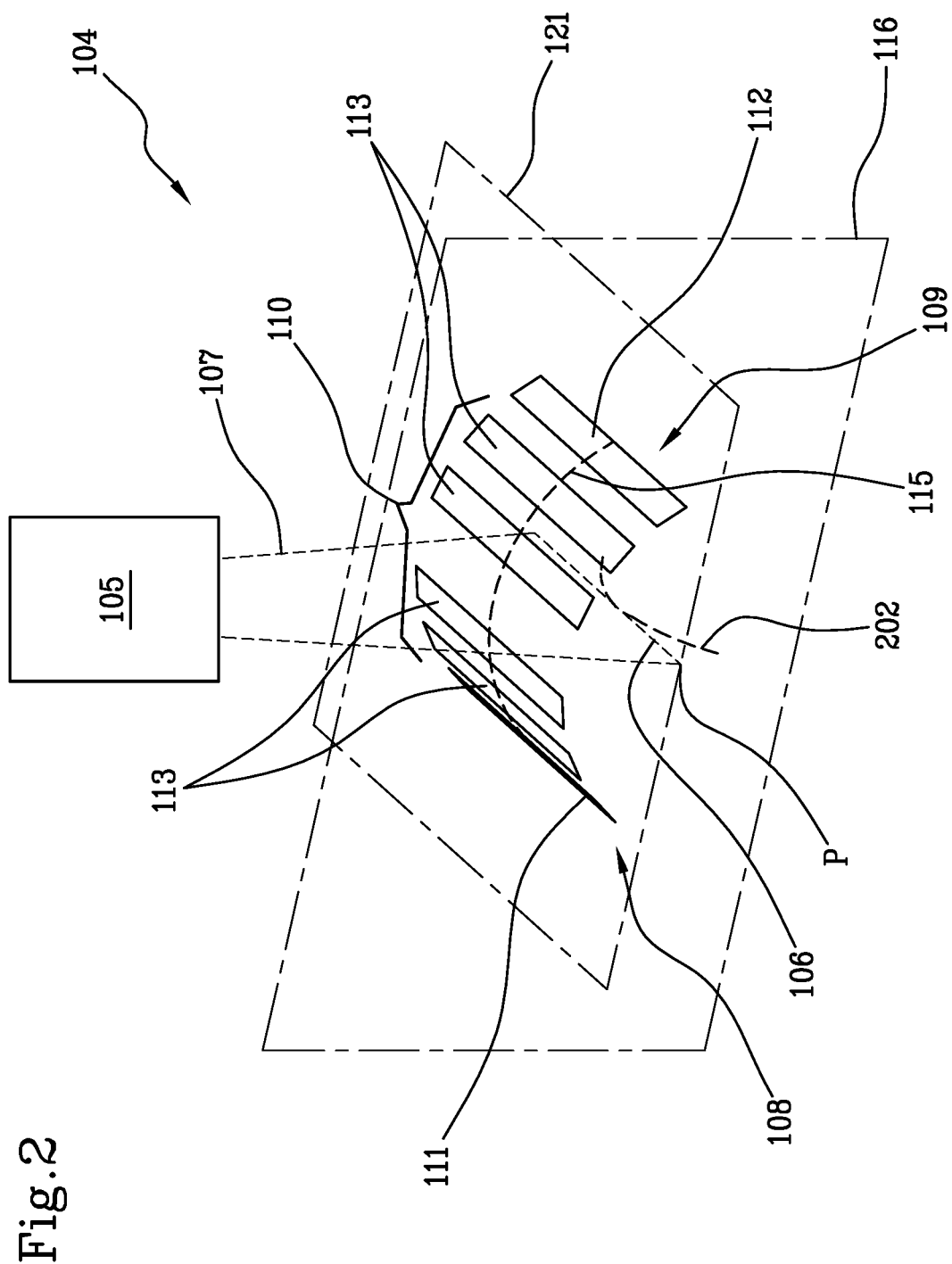

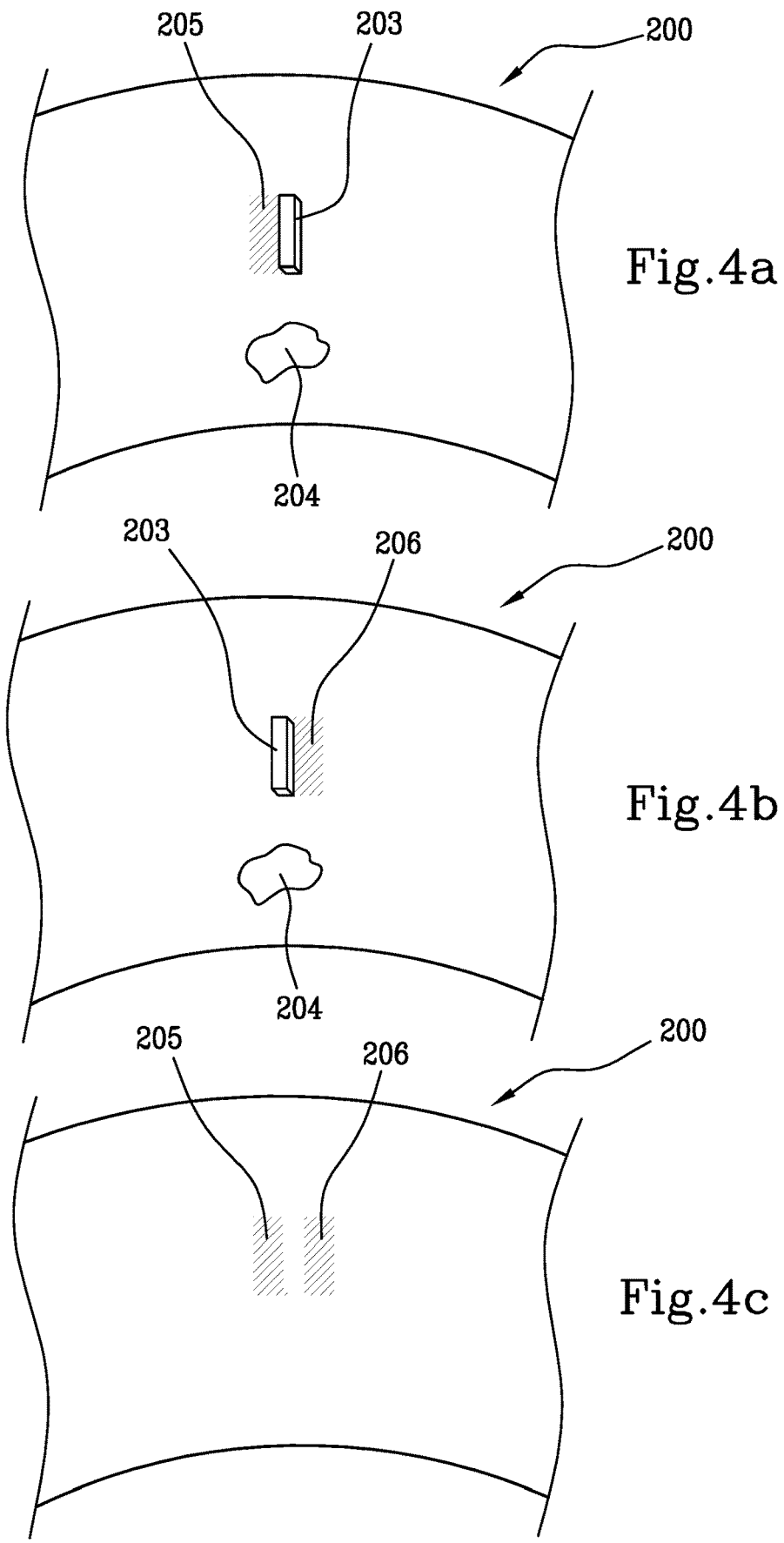

METHOD AND APPARATUS FOR CHECKING TYRES IN A PRODUCTION LINE

CROSS REFERENCE TO RELATED APPLICATIONS

The present application is the U.S. national stage of International Patent Application PCT/IB2015/059575 filed internationally on Dec. 14, 2015, which, in turn, claims priority to Italian Patent Application No. MI2014A002215 filed on Dec. 22, 2014.

The present invention relates to a method and an apparatus for checking tyres in a tyre production line, in particular through acquisition of images of the surface of a tyre and their subsequent processing, e.g. for checking the possible presence of defects visible on the surface of a tyre.

By "tyre" it is typically intended the finished tyre, i.e. after the steps of moulding and vulcanisation following the building step, but also possibly the green tyre after the step of building and before the moulding and/or vulcanisation.

Typically, a tyre has a substantially toroidal structure around a rotation axis thereof during operation, and has an axial centreline plane orthogonal to the rotation axis, said plane being typically a plane of (substantial) geometric symmetry (e.g. ignoring possible minor asymmetries, such as the design of the tread and/or the internal structure).

By external or internal surface of the tyre, it is respectively intended the surface that remains visible after the coupling of the tyre with its mounting rim and the surface which is no longer visible after said coupling.

The terms 'optical', 'light' and the like refer to an electromagnetic radiation which has at least one portion of the spectrum falling within an enlarged range of the optical band, and not necessarily falling strictly within the optical band (i.e. 400-700 nm); for example, such enlarged range of the optical band can extend from the ultraviolet to the infrared (e.g. wavelength comprised between about 100 nm and about 1 µm).

In the present application, a ray model of the light radiation is employed, i.e. it is assumed that a light radiation incident on a point of a surface and generated by a non-point source (in such case there would be only one ray) corresponds with a set of light rays incident on the point and having rectilinear propagation direction that connects each point of the source with said point of the surface, wherein each of such rays has, associated therewith, a fraction of the overall light power incident on the point.

By "directional light radiation" incident at a point of a surface, it is intended a light radiation for which there is a solid angle having the point as vertex and amplitude smaller than or equal to $\pi/8$ steradians within which at least 75% of the overall light power, preferably at least 90%, more preferably all the light power lies.

By "diffuse light radiation" it is intended a non-directional light radiation.

By "grazing light radiation" incident at a point of a surface, it is intended a light radiation in which at least 75% of the overall light power of the same incident on the point of the surface forms, with a plane tangent to the surface at said each point, an incidence angle smaller than or equal to 60°.

By "image" or synonymically "digital image", it is generally intended a set of data, typically contained in a computer file, wherein each coordinate (typically two-dimensional) of a finished set (typically two-dimensional and matrix, i.e. N lines×M columns) of spatial coordinates (each typically corresponding to one pixel) is associated with a corresponding set of number values (which can be representative of sizes of different type). For example, in the monochromatic images (such as 'greyscale' images), such set of values coincides with a single value in a finished scale (typically with 256 levels or tones), such value being for example representative of the brightness (or intensity) level of the respective spatial coordinate when displayed, while in the colour images the set of values represents the brightness level of a multiplicity of colours or channels, typically the primary colours (e.g. in the code RGB, red, green and blue, while in the code CMYK cyan, magenta, yellow and black). The term 'image' does not necessarily imply the actual display of the same.

In the present description and claims, each reference to a specific "digital image" (e.g. a two-dimensional digital image initially acquired on the tyre) more generally comprises any one digital image obtainable through one or more digital processing of said specific digital image (such as filtering, equalisations, thresholding, morphological transformations—openings, etc.,—gradient calculations, smoothing, etc.).

By "linear surface portion" it is intended a surface portion having a size much greater than the other size orthogonal thereto, typically greater than at least two orders of magnitude. The smaller size of the linear surface portion is typically smaller than or equal to 0.1 mm.

By "linear image" it is intended a digital image having a number of columns of pixels much greater than the number of lines, typically greater than at least two orders of magnitude. Typically the number of lines is between 1 and 4 and the number of columns is greater than 1000. The terms 'lines' and 'columns' are used conventionally and are interchangeable.

In the field of the processes of production and building of tyres for vehicles wheels, there is the need to execute quality checks on the manufactured products, with the purpose of preventing defective tyres or in any case those outside design specifications from being placed on the market, and/or progressively adjusting the employed apparatuses and the machines, so as to improve and optimize the execution of the operations carried out in the production process.

Such quality checks for example include those executed by human operators, who dedicate a pre-established time on a visual and tactile examination of the tyre; if, in light of the operator's own experience and sensitivity, he/she should suspect that the tyre does not comply with certain quality standards, the tyre itself is subjected to further checks, by means of a more detailed human check and/or suitable equipment, for the purpose of providing an in-depth evaluation of possible structural and/or qualitative deficiencies.

US 2010/0002244 A1 describes a technique for inspecting the surface of a tyre that is capable of discriminating, with certainty, small pieces of rubber of different quality incorporated in the surface of the tyre. A first illumination unit includes a pair of first light projectors which project the light towards an objective line, respectively from opposite sides. A second illumination unit includes a pair of second light projectors which project the light towards the objective line in a direction different from that of the first illumination unit and respectively from opposite sides. The first and second illumination unit alternately illuminate. A linear camera forms an image of a surface portion of the tyre corresponding with the objective line synchronously with the respective illumination operations of the first and second illumination unit.

US 2004/0212795 A1 describes a method for measuring a border and/or a deformation of an object. In order to improve the quality of the image, a first image is created with a first configuration of the camera and/or of the radiation source which is adapted for a first region of the image. In addition, a second image is created with a second configuration of the camera and/or of the radiation source which is adapted for a second region of the image. The two images are combined.

U.S. Pat. No. 6,680,471 B2 describes an apparatus capable of uniformly illuminating the curved internal surface of a tyre by means of LED and CCD.

US 2012/0134656 A1 describes an illumination device and an inspection device for a tyre which can easily detect shape abnormalities in a produced tyre.

In the field of tyre checks, the Applicant has set the problem of analysing the internal and/or external surface of the tyre, by means of optical acquisition of digital images of the same and their subsequent processing, for example in order to detect the possible presence of defects visible on the surface. The sought-after defects can for example be irregularities on the surface of a tyre (non-vulcanised compound, shape alterations, etc.), structural non-uniformities, cuts, presence of foreign bodies on the surface, etc.

The Applicant has observed that for the check to be employed "in line" within a plant for producing tyres, it is necessary that the check itself is executed in limited times and with reduced costs.

The Applicant has also observed that in the "three-dimensional" images (i.e. each pixel thereof is associated with surface altitude information, e.g. the images obtained with laser triangulation), some two-dimensional defects (i.e. which do not involve an alteration of the altitude of the surface, such as the cuts with mating edges) are difficult to detect, or are not at all detectable, by means of image processing.

In addition, the size resolution of the three-dimensional images, in particular in the direction of the altitude, at times does not result sufficiently high for detecting defects that are not very marked.

The Applicant has therefore perceived that it is advantageous to detect and analyse "two-dimensional" images (in addition to or in alternative to the 3D images).

For the purpose of the present description and claims, the term 'two-dimensional image' signifies a digital image, each pixel thereof associated with information representative of the reflectivity/diffusivity and/or of the colour of the surface, such as the images detected by common digital cameras.

The Applicant has realized that the method of check of the tyres with optical acquisition of two-dimensional images described in US 2010/0002244 A1, in which the objective line is simultaneously illuminated from opposite sides, does not allow the effective discrimination between three-dimensional elements (i.e. reliefs and/or depressions on the surface) and two-dimensional elements (such as colour stains and/or brightness spots due to reflectivity/diffusivity variation). Indeed, the obtained two-dimensional image is the set of images acquired with diffuse light.

The Applicant has also realized that the check method with optical acquisition of two-dimensional images described in US 2004/0212795 A1, in which the image acquired with illumination from the left side and that acquired with illumination from the right side are combined together in a complete optimized image with respect to respectively over-exposed and under-exposed regions, is not suitable for the effective discrimination between three-dimensional elements and two-dimensional elements. Indeed, the combination of the images is carried out pixel-by-pixel by selecting the individual contribution with the highest quality or by calculating the weighted average over the quality value.

The Applicant has therefore set the problem of implementing a method and an apparatus for checking tyres based on the optical acquisition of two-dimensional images (in particular for detecting defects on the surface of tyres), which are suitable for being inserted in line within a tyre production line of a production plant, i.e. with reduced operating times and costs, reliable in the obtained result, and in addition with a high level of sensitivity in discriminating reliefs and/or depressions on the surface from two-dimensional surface elements or stains.

The Applicant has perceived that the comparison between two-dimensional images obtained with grazing illumination could lead to the desired solution of discriminating surface reliefs and/or depressions (i.e. three-dimensional elements) from stains or other two-dimensional elements, i.e. obtaining a qualitative altimetric profile of the surface of the tyre subjected to check.

More precisely, the Applicant has finally found that by comparing an image obtained with grazing illumination from one direction with an image obtained with grazing illumination from a different direction substantially opposite the first, it is possible to effectively detect the possible presence of structures in relief or in depression with respect to the surface, while using two-dimensional images (and not 3D images).

More precisely according to a first aspect, the invention relates to a method for checking tyres in a tyre production line.

Preferably provision is made for providing a tyre to be checked.

Preferably provision is made for illuminating, with a first grazing light radiation, a surface portion of said tyre and acquiring a first image of said surface portion illuminated by said first light radiation, said first image being two-dimensional.

Preferably provision is made for illuminating substantially said surface portion, at a different time from that at which the surface portion is illuminated with the first radiation, with a second grazing light radiation and acquiring a second image of substantially said surface portion illuminated by said second light radiation, said second image being two-dimensional.

The expression 'substantially said surface portion', or, hereinbelow, 'substantially a same surface portion', signify that the first and second image show two respective surface portions that can be spatially separate from each other but are comparable according to the present invention, i.e. they show the same elements substantially in the same position. For example, the two images can be separated, on the plane of the surface itself, by a distance less than 0.2 mm, preferably less than or equal to 0.1 mm. Advantageously said distance is less than or equal to the linear size of surface associated with a pixel (the latter being as an example equal to 0.1 mm). In other words each pixel of the first image shows a micro-surface portion that lies less than 0.2 mm from the micro-surface portion shown by the pixel of the second image corresponding to said each pixel.

Preferably, for each point of said surface portion, at least 75% of the respective overall light power of said first and second light radiation incident at the point respectively comes from two half-spaces that are opposite with respect to an optical plane passing through the perpendicular to the surface of the tyre at said each point.

Preferably provision is made for processing said first and second image, wherein said first and second image are compared with each other in order to obtain information on an altimetric profile of said surface portion.

In accordance with a second aspect, the invention relates to an apparatus for checking tyres in a tyre production line.

Preferably a support for a tyre is comprised.

Preferably a first light source and a second light source are comprised, adapted to respectively emit a first and a second light radiation for illuminating substantially a same surface portion of said tyre, and a detection system is comprised that is adapted to acquire a first and second image of substantially said surface portion illuminated respectively by said first and second light radiation, said first and second image being two-dimensional images.

Preferably a command and control unit is comprised, configured for:
  alternately activating said first light source and second light source and
  activating said detection system in order to acquire said first and second image synchronously with the activation of the first and second source, respectively.

Preferably a processing unit is comprised, configured for the following functions:
  receiving, from the detection system, said first and second image;
  processing said first and second image, wherein said first and second image are compared with each other in order to obtain information on an altimetric profile of said surface portion.

Preferably said first light radiation is grazing.

Preferably said second light radiation is grazing.

Preferably, for each point of said surface portion, at least 75% of the respective overall light power of said first and second light radiation incident at the point respectively comes from two half-spaces that are opposite with respect to an optical plane passing through the perpendicular to the surface of the tyre at said each point.

The Applicant deems that, for the purpose of analysing the surface during a check of tyres in a production line, in particular in order to detect the qualitative altimetric profile of said surface, by means of acquisition and processing of two-dimensional digital optical images, it has proven to be particularly advantageous to alternately illuminate the surface with grazing light from opposite sides and compare the digital images thus obtained, since it is thus possible for example to distinguish two-dimensional stains/marks and/or detect three-dimensional elements that are even quite small (e.g. with height below 0.1 mm) and/or highlight the three-dimensional elements.

The Applicant deems that the present method and apparatus can allow discriminating the structures in relief or in depression on the surface from two-dimensional surface elements (lacking altitude alterations), such as colour stains and/or diffusivity/reflectivity spots. In such a manner, it is possible for example to limit the processing of images (even those obtained in diffuse light) by removing the two-dimensional surface elements (e.g. simple stains) from the search for surface defects which involve an alteration of the altitudes, or it is possible to precisely identify three-dimensional elements, such as the pitting and/or ruling left in relief on the internal surface of the tyre by the expandable bladder used in the vulcanisation moulds, for the purpose of the digital processing thereof.

The Applicant deems that the present method and apparatus can detect three-dimensional elements with a resolution along the height of the elements even greater than that obtainable with three-dimensional images.

More precisely the Applicant observes that the images acquired with illumination from the left side and from the right side are not combined together in order to optimize the light exposure over the entire surface portion, according to the methods of the type described in US 2004/0212795 A1. Finally, the Applicant observes that the combination of the images is not carried out pixel-by-pixel by selecting the individual contribution with the highest quality, or by calculating the weighted average over the quality value according to the methods of the type described in US 2004/0212795 A1; rather, the two images are compared with each other, i.e. the emphasis of the analysis is placed on the differences between the two images and not on the evaluation of the quality associated with each pixel.

The present invention, in at least one of the aforesaid aspects, can also have one or more of the preferred characteristics described hereinbelow.

Preferably a time lag in the acquisition of the two pixels belonging to each pair of corresponding pixels of the first and second image is less than 0.5 milliseconds, more preferably less than or equal to 0.2 milliseconds. In such a manner, advantageously, it is possible to acquire the entire superficial circular extension of a tyre in less than 10 s, e.g. in 5 s.

Preferably said comparison between the first and second image comprises calculating the difference between said first and second image.

More preferably said comparison between the first and second image comprises calculating a difference image in which each pixel is associated with a value representative of the difference between the values associated with the corresponding pixels in said first and second image. In such a manner, with a simple mathematical calculation, the difference of reflectivity/diffusivity of each pixel at the first and second grazing radiation is indicated.

Preferably before comparing the first and second image with each other, provision is made for equalising said first and second image with respect to each other. In such a manner, the result of the comparison is more precise in indicating the qualitative altimetric profile.

Preferably said processing of said first and second image comprises detecting the possible presence of defects on the surface portion.

Preferably for each point of said surface portion at least 90% of the respective overall light power of said first and second light radiation incident at the point respectively comes from said two opposite half-spaces.

More preferably for each point of said surface portion, all the respective overall light power of said first and second light radiation incident at the point respectively comes from said two opposite half-spaces. In such a manner, the contrast between the two illuminations is accentuated.

Preferably at least 75%, more preferably at least 90%, of the respective overall light power of said first and second light radiation incident on each point of said surface portion forms, with a plane tangent to the surface of said tyre at said each point, a first incidence angle with amplitude smaller than or equal to 55°, more preferably smaller than or equal to 50°. In such a manner, the grazing effect of the light is accentuated.

Preferably at least 75%, more preferably at least 90%, of the respective overall light power of said first and second light radiation incident on each point of said surface portion forms, with a plane tangent to the surface of said tyre at said each point, a first incidence angle having amplitude greater than or equal to 10°, more preferably greater than or equal to 20°, still more preferably greater than or equal to 30°. In such a manner, the illumination is allowed even with light sources placed in close proximity with the surface of the tyre.

Preferably at least 75%, more preferably at least 90%, of the respective overall light power of said first and second light radiation incident on each point of said surface portion forms, with a reference plane orthogonal to said optical plane at said each point and passing through the perpendicular to the surface at said each point, a second incidence angle smaller than or equal to 45°, more preferably smaller than or equal to 30°, in absolute value. In such a manner, the difference of illumination between the first and the second radiation is accentuated.

Preferably provision is made for illuminating said surface portion, at a time different from those when the surface portion is illuminated with the first and with the second radiation, with a third light radiation different from the first and second radiation, and acquiring a third image of said surface portion illuminated by said third light radiation, said third image being two-dimensional.

Preferably a third light source is comprised that is adapted to emit a third light radiation for illuminating said surface portion, wherein said detection system is adapted to acquire said third image and wherein said command and control unit is configured for activating said third light source at a time different from those when the surface portion is illuminated with the first and with the second radiation, and driving said detection system in order to acquire said third image synchronously with the activation of the third source.

Preferably the third light radiation is diffuse.

Preferably provision is made for processing said third image in order to detect the possible presence of defects on the surface portion, said processing using the information obtained from the aforesaid comparison between the first and second image.

Thus, the processing of the third image acquired with diffuse light uses the information obtained from the comparison of the two images in grazing light. For example, in such a manner it is possible to discard the two-dimensional stains from the possible defects in the third image. On the other hand, the defect search is carried out not on the images in grazing light but on the third image acquired with diffuse light which is more suitable for a complete reproduction of the surface portion.

Preferably said first and second digital image are composed of a respective plurality of first and second linear images of a succession of linear surface portions contiguous or partially superimposed on each other, said first and second linear images being acquired on each linear portion of said succession of linear portions illuminated respectively by said first and second light radiation in alternated sequence.

Preferably said third digital image is composed of a plurality of third linear images of said succession of linear surface portions, said third linear images being acquired on each linear portion of said succession of linear portions illuminated by said third light radiation, in sequence alternating with said acquisition of said respective first and second linear images.

In such a manner, it is possible to acquire the respective images along the entire circular extension of the tyre by means of a linear camera.

Preferably the detection system comprises a linear camera having an objective line.

Preferably said linear surface portions are arranged in proximity to said objective line in time succession.

Preferably said succession of linear portions is obtained by rotation of the tyre around its axis.

Preferably the apparatus comprises a movement member adapted to rotate said support, and hence the tyre, around its rotation axis, the command and control unit being configured for driving said movement member.

In such a manner, there is the succession of linear surface portions at the objective line of the linear camera, which can remain fixed.

Preferably the apparatus comprises a system for detecting the angular position of said support (e.g. an encoder), the command and control unit being configured for activating said first light source, second light source, and third light source and driving said detection system as a function of a signal of angular position of the support sent by said angular position detection system. In such a manner, the succession of linear surface portions is correctly acquired, independent of the rotation speed of the tyre.

Further characteristics and advantages will be clearer from the detailed description of several exemplary but non-exclusive embodiments of a method and an apparatus for checking tyres in a tyre production line, in accordance with the present invention. Such description will be set forth hereinbelow with reference to the set of figures, provided only as a non-limiting example, in which:

FIG. 2 shows a partial and schematic perspective view of a detail of FIG. 1;

Figure 1:
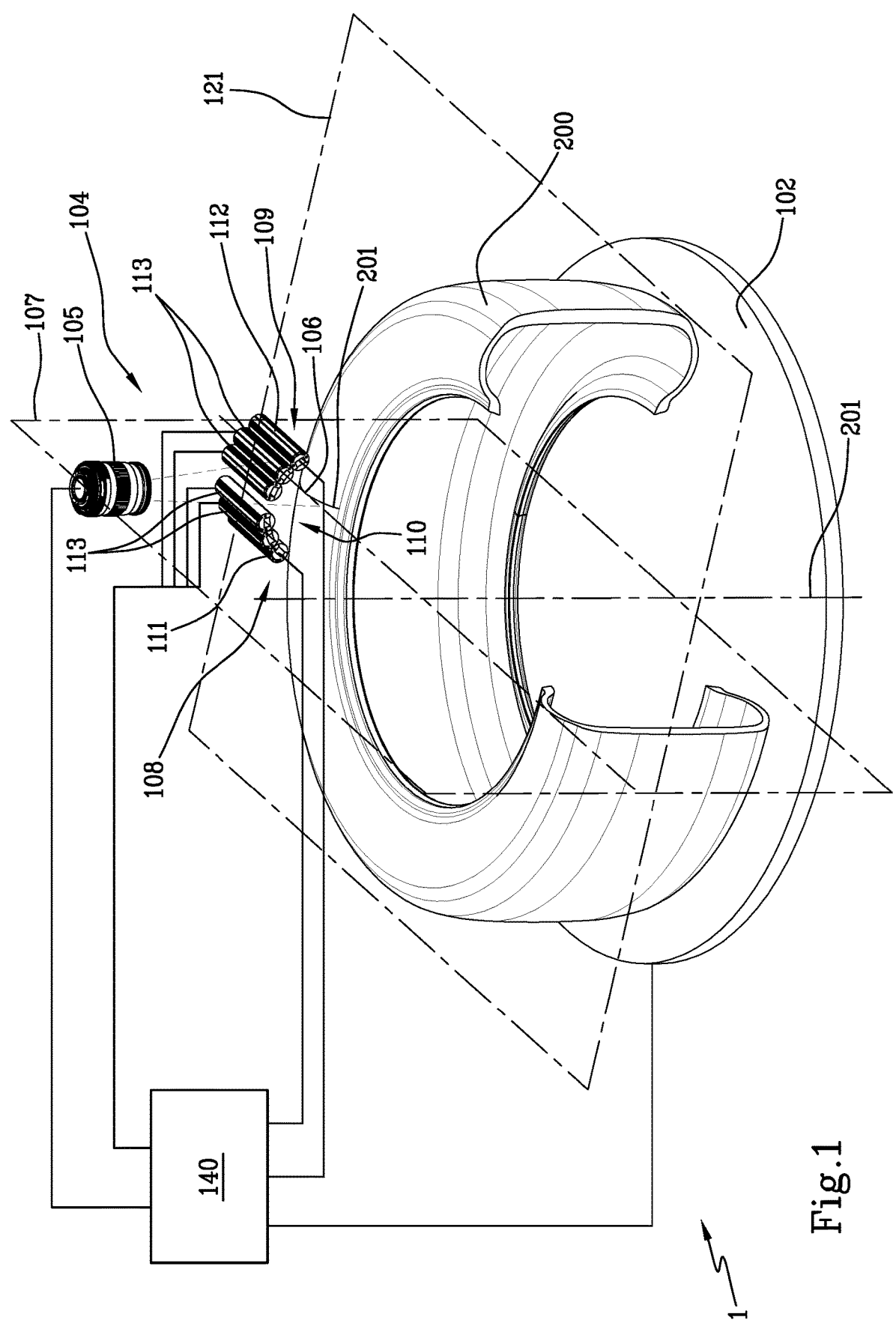
FIG. 1 shows a partial and schematic perspective view, partially in cross section and partially in terms of functional blocks, of an apparatus for checking tyres in accordance with a first embodiment of the present invention.

FIGS. 4a and 4b schematically show an image of a tyre surface portion illuminated respectively with right and left grazing light;

FIG. 4c schematically shows an image obtained via comparison of the images 4a and 4b.

With reference to the figures, reference number 1 generally indicates an apparatus for checking tyres in a tyre production line according to the present invention. Generally, the same reference number will be used for possible variants of similar elements.

The apparatus 1 comprises a support 102 adapted to support the tyre 200 on one sidewall and to rotate the same around its rotation axis 201, typically arranged according to the vertical. The support 102 is typically actuated by a movement member that is not further described and illustrated, since it can as an example be of known type. The support for the tyre may possibly be configured for blocking the same, for example the respective abutted bead.

Preferably a detection system 104 is comprised, comprising a linear camera 105 having an objective line 106 lying on an optical plane 107 passing through the linear camera. The present invention also contemplates the alternative case in which the camera is a matrix camera ('area camera'). In such case, also the illuminated and acquired surface portion is matrix.

Figure 2A:
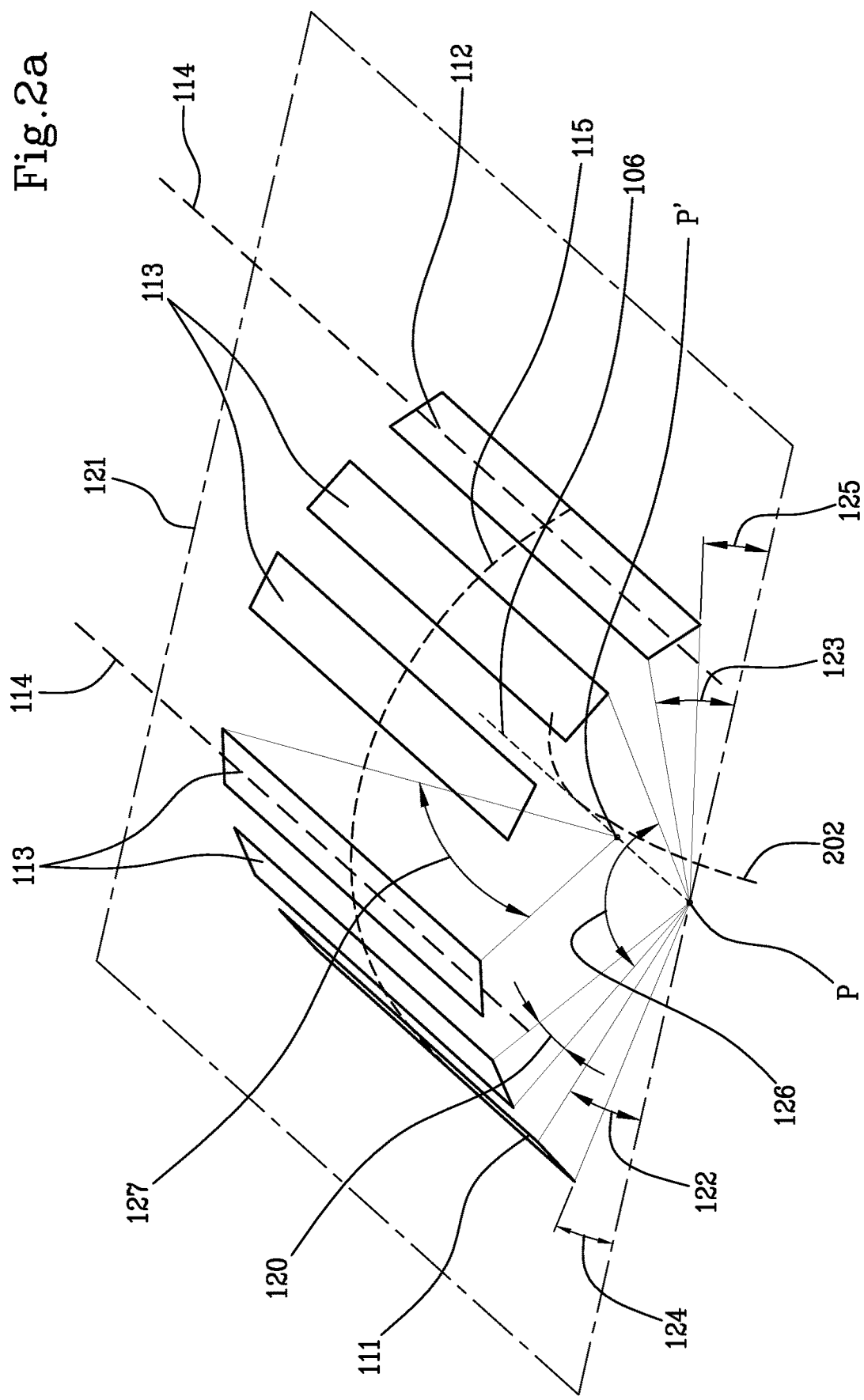
FIG. 2a shows an enlarged detail of FIG. 2.

The apparatus comprises a first light source 108, a second light source 109 and a third light source 110 adapted to respectively emit a first, a second and a third light radiation for illuminating a linear surface portion 202 of said tyre coinciding with the objective line (e.g. when the surface portion is planar) or in proximity to the objective line (due to the curvilinear progression of the surface of the tyre), as shown in FIGS. 1 and 2, 2a.

The detection system is adapted to acquire a respective two-dimensional digital image of the linear surface portion illuminated by at least one from among the first, second and third light radiation.

Typically the apparatus comprises a robotic arm (not shown) on which said first light source, second light source and third light source and the detection system are mounted. Preferably the first light source 108 and the second light source 109 are each constituted by a single respective sub-source 111 and 112.

Preferably the third light source 110 is constituted by four respective sub-sources 113 distributed on both sides of the optical plane 107 and symmetrically with respect to such plane.

Each sub-source 111-113 has a respective main extension direction (indicated as an example with the dashed lines 114 in FIG. 2a) which is extended parallel to the optical plane 107 and hence to the objective line 106.

Each sub-source typically comprises a plurality of LED sources arranged aligned along the main extension direction.

In the enclosed figures, the sub-light sources are schematically shown with reference to their respective emitting surface (in the figures, as an example with rectangular shape), which for example can coincide with a transparent protection glass and/or diffuser.

Figure 3:
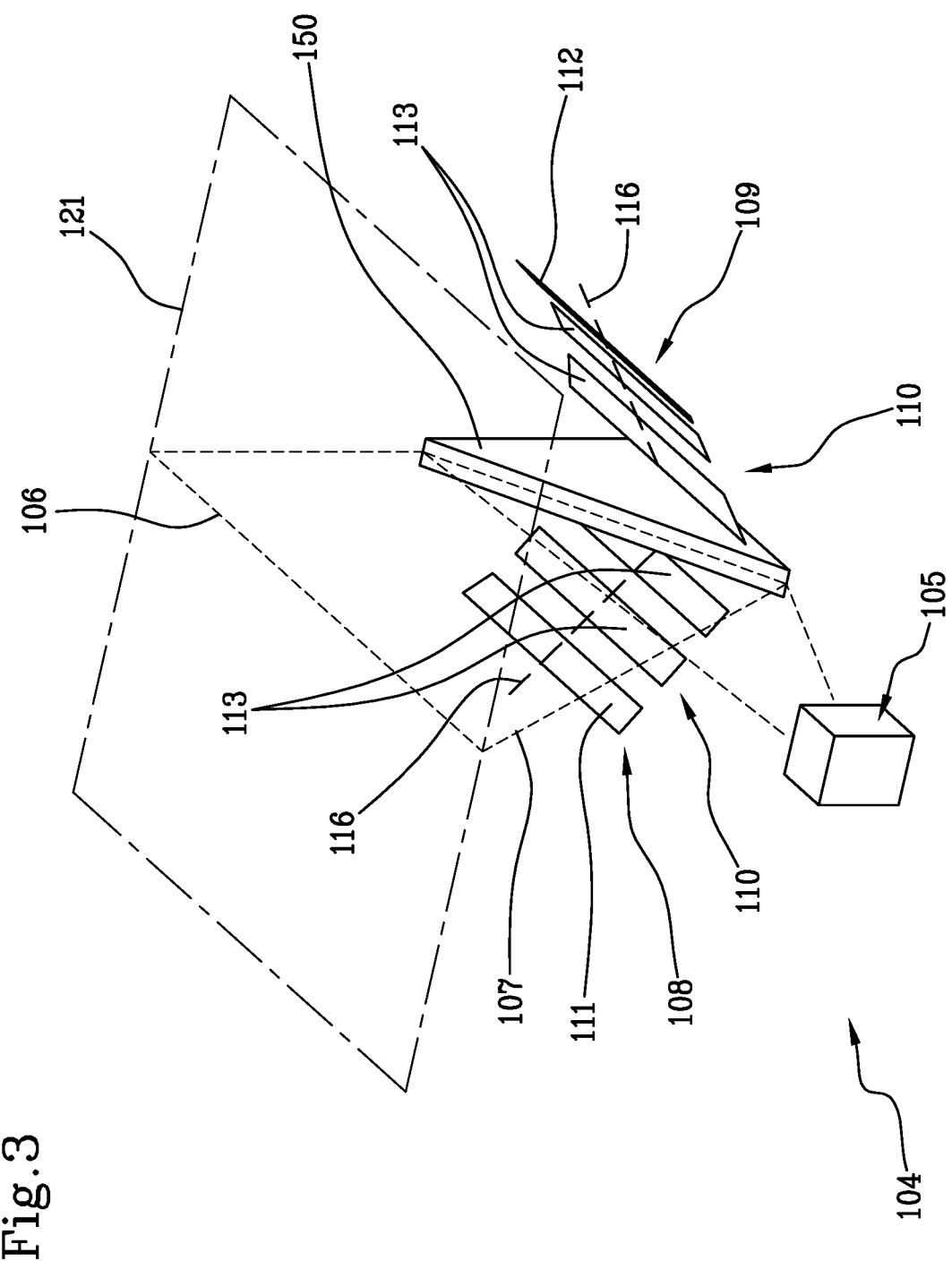
FIG. 3 shows a partial and schematic perspective view of an apparatus for checking tyres in accordance with a second embodiment of the present invention.

As an example, the sub-sources have a size along the main extension direction 114 equal to 10 cm for the embodiment shown in FIG. 2 and 6 cm for the embodiment shown in FIG. 3, and a size along the direction orthogonal to the main extension direction equal to about 1 cm.

Preferably the sub-sources 111 and 112 respectively lie on opposite sides with respect to the optical plane and are equidistant therefrom.

Preferably the distance of the sub-sources 113 of the third light source from the optical plane 107 is less than the distance between each sub-source of said first light source and second light source and the optical plane.

Preferably the sub-sources of the first light source, second light source and third light source are arranged in a manner such that for their entire extension they are superimposed in a view orthogonal to the objective line. As an example all the first and second ends, with respect to the main extension direction, lie on a respective plane orthogonal to the objective line.

In one embodiment, as shown as an example in FIGS. 1 and 2, 2a, the sub-sources of the first light source, second light source and third light source are arranged along a line (indicated with the number 115 in FIG. 2) on a reference plane 116 orthogonal to the objective line, line 115 being shaped as an arc of a circle with centre on the objective line (i.e. the sub-sources are equidistant from the objective line).

In an alternative embodiment, as shown in FIG. 3, the sub-sources are arranged along an angle line (indicated with the number 116 in FIG. 3) on the reference plane 116, with vertex on the optical plane 107.

As an example, for each point P (as an example indicated at one end in FIGS. 2 and 2a) of the objective line, a respective angle 120 (in FIG. 2a, shown with reference to a sub-source 113) having vertex at the point P and lying in a plane orthogonal to the objective line, and subtended by each of the sub-sources is equal to 6°.

As an example, taking a focal plane 121 orthogonal to the optical plane and passing through the objective line 106, the respective maximum angle 122 and 123 among all the angles formed between the focal plane and the planes passing through the objective line and all the points respectively of the first light source 108 and the second light source 109 (respectively of the sub-sources 111 and 112) is equal to 48°.

As an example, the respective minimum angle 124 and 125 among all the angles formed between the focal plane and the planes passing through the objective line and all the points respectively of the first light source and the second light source is equal to 42°.

Preferably the third light source 110 is adapted for illuminating the objective line with diffuse light.

As an example, a respective angle 126 having vertex at each point P of the objective line and lying in a plane orthogonal to the objective line, and subtended by the third light source, is equal to about 80°. In such a manner, a wide solid angle of the diffuse light is obtained.

As an example, a respective angle having vertex at each point P of the objective line and lying in the aforesaid orthogonal plane, and subtended by the set of the first light source, the second light source and the third light source, is equal to 96°.

In one embodiment of the apparatus particularly suitable for inspecting the internal surface of the tyre, as an example shown in FIG. 3, the detection system comprises a mirror 150 (also typically mounted on the robotic arm) having flat reflective surface arranged at the third light source perpendicular to the optical plane and intersecting the latter (typically on the median line of the mirror) in a manner so as to reflect the objective line in the optical plane by an angle as an example equal to 90°.

Preferably a command and control unit 140 is comprised that is configured for:

selectively activating one or more of said first light source, second light source and third light source;

activating the linear camera in order to acquire a respective two-dimensional digital image (colour or monochromatic) of the linear surface portion synchronously with the activation of one or more of said first light source, second light source and third light source.

The command and control unit is typically configured for also driving the movement member of the support 102. In such a manner, there is the succession of linear surface portions at the objective line of the linear camera, which can remain fixed.

Preferably the apparatus comprises an encoder (not shown) for detecting the angular position of the support, the command and control unit being configured for activating said first light source, second light source, and preferably third light source and driving the detection system as a function of a signal of angular position of the support sent by the encoder.

Preferably the command and control unit 140 is configured for:

activating in alternated sequence said first light source, second light source and third light source;

driving the linear camera in order to acquire respectively a first, second and third image synchronously with the activation of the first light source, the second light source and the third light source, respectively. In such a manner it is possible to acquire both an image in diffuse light and two images in grazing light.

Preferably a processing unit (e.g. integrated in the command and control unit 140) is comprised, configured for the following functions:

receiving the acquired images from the linear camera;

processing the images in order to check the surface portion.

Preferably the processing unit is configured for calculating the difference between the first and second image in order to obtain information on an altimetric profile (e.g. possible presence or lack of reliefs and/or depressions) of the linear surface portion.

Preferably, calculating the difference between the first and second image comprises calculating a difference image in which each pixel is associated with a value representative of the difference between the values associated with the corresponding pixels in the first and second image. In such a manner, it is possible to use the image obtained from the difference between the first and second image in order to indicate the three-dimensional elements (such as the pitting in relief on the internal surface of the tyre or the writing in relief) and keep such information under consideration in processing the image in diffuse light in order to search for defects.

A method for checking the surface of tyres in a tyre production line, as an example implemented by means of the aforesaid apparatus, is described hereinbelow.

First of all, a tyre 200 to be checked, for example abutted against a sidewall above the support 102, is arranged.

The command and control unit 140 drives the robotic arm in order to move the light sources close to the (external or internal) surface of the tyre, in a manner such that a linear surface portion at least partially coincides with, or is in proximity to, the objective line.

Then, the command and control unit drives the movement member of the support 102 in order to rotate the tyre.

As a function of the signal of angular position received by the encoder, with the rotation of the tyre underway, the command and control unit cyclically activates, in rapid alternated sequence, said first light source, second light source and third light source and activates the linear camera in order to acquire a respective two-dimensional digital image (colour or monochromatic) of the respective linear surface portion synchronously with the activation of the first light source, the second light source and the third light source, respectively. As an example, each single digital image of a linear portion comprises 1×2048 pixels in case of monochromatic camera, or 2×2048 pixels in the case of bilinear or RGB colour camera. As an example, the time lag between the acquisition of the first and second linear image, as well as between the second and third linear image and then cyclically between the first and third linear image, is less than 0.2 milliseconds.

After having executed the desired rotation of the tyre for sounding the desired surface portion, preferably at least one complete rotation in order to acquire the entire circular extension, a single digital image is obtained that is achieved with all the digital images of the sequence of linear portions, each illuminated with a respective light source. The processing unit receives such image from the detection system and separates the corresponding first, second and third image of the entire desired surface portion.

Such images are substantially superimposable pixel-by-pixel, even if the actual linear surface portion associated with a single linear image does not exactly coincide for the three images, due to the rotation of the tyre that in the meantime took place. Nevertheless, the selection of the acquisition frequency of the images and of the rotation speed is such that the three images are interlaced with each other and hence can be compared pixel-by-pixel. Advantageously, each pixel of the first (or second or third) image shows a micro-surface portion which is separated from the micro-surface portion shown by the pixel of the second (or respectively third or first) image corresponding to said each pixel, except for the linear surface size associated with a pixel, as an example the spatial gap being equal to about a third of a pixel. In such a manner, the three images are interlaced with each other and the acquisition of the three linear images occurs in a time interval during which the tyre has rotated a section equal to one pixel (as an example equal to 0.1 mm).

As stated, for each point of each linear surface portion, and hence for each point of the sounded surface portion, at least 75% of, as an example all of, the respective overall light power of the first and second light radiation incident at the point respectively comes from two half-spaces that are opposite with respect to the optical plane 107.

In addition, for each point of each linear surface portion at least 75% of the, as an example all the, respective overall light power of the first and second light radiation incident on the point forms, with the plane tangent to the surface at the point (i.e. the focal plane 121), an incidence maximum angle 122 and 123 equal to about 48° (grazing light).

Preferably all the respective overall light power of the first, second and third light radiation incident on each point of the surface portion (or objective line) forms, with a reference plane 116 orthogonal to the optical plane and passing through the perpendicular to the surface at the point, an incidence angle smaller than or equal to 45°, in absolute value. For example, the angle 127 having vertex at any point (indicated as an example with P' in FIG. 2a) of the objective line, lying in any one plane passing through the objective line and through the first light source and the second light source or the third light source, and subtended by the first light source, by the second light source or by the third light source, respectively, is equal to 60°. In such a manner, advantageously, each sub-source emits a directional light radiation incident on the objective line.

Preferably the processing unit processes the first and second image, comparing them with each other in order to obtain information on an altimetric profile of the surface portion.

Preferably the comparison between the first and second image comprises calculating a difference image in which each pixel is associated with a value representative of the difference between the values associated with the corresponding pixels in the first and second image.

Preferably, before comparing the first and second image with each other, provision is made for equalising the first and second image with respect to each other, for example by equalising the average brightness thereof overall or locally.

Preferably the processing unit processes the third image in diffuse light in order to detect the possible presence of defects on the surface portion, using the information obtained from the aforesaid comparison between the first and second image.

FIGS. 4a and 4b schematically show an embodiment respectively of a first and second image of a surface portion of tyre 200 comprising an element in relief 203 and an element without reliefs, or two-dimensional element, 204 (such as a release agent stain).

In FIG. 4a, where the image is obtained with grazing light from the right of the figure, the image comprises a shade zone 205 projected towards the left by the element 203; in FIG. 4b, where the image is obtained with grazing light from the left of the figure, the image comprises a shade zone 206 projected towards the right by the same 203. It is observed that the element 204 is instead acquired substantially in an identical manner in the two images, since it equally meets the right and left grazing illuminations.

FIG. 4c schematically shows a difference image obtained by associating each pixel with the difference, in absolute value, between the values of the two images of FIGS. 4a and 4b. As can be seen, at the two-dimensional stain 204, the difference image does not have any brightness variation, while at the element in relief 203 (marked with shading in FIG. 4c) there is a considerable brightness variation, marking the presence of the element itself 203.

The invention claimed is:

1. A method for checking tyres in a tyre production line, the method comprising:
    providing a tyre to be checked;
    illuminating, with a first grazing light radiation, a surface portion of said tyre and acquiring a first image of said surface portion illuminated by said first light radiation, said first image being two-dimensional;
    illuminating substantially said surface portion, at a time different from that when the surface portion is illuminated with the first radiation, with a second grazing light radiation and acquiring a second image of substantially said surface portion illuminated by said second light radiation, said second image being two-dimensional; wherein for each point of said surface portion, at least 75% of an overall light power of said first light radiation incident at said each point and at least 75% of an overall light power of said second light radiation incident at said each point respectively come from two half-spaces that are opposite with respect to an optical plane passing through the perpendicular to the surface of the tyre at said each point; and
    processing said first and second images, wherein said first and second images are compared with each other in order to obtain information on an altimetric profile of said surface portion.

2. The method according to claim 1, wherein said comparison between the first and second images comprises calculating the difference between said first and second images.

3. The method according to claim 1, wherein said comparison between the first and second images comprises calculating a difference image in which each pixel is associated with a value representative of the difference between the values associated with the corresponding pixels in said first and second images.

4. The method according to claim 1, wherein said processing of said first and second images comprises detecting the possible presence of defects on the surface portion.

5. The method according to claim 1, wherein for each point of said surface portion, at least 90% of the overall light power of said first light radiation incident at said each point and at least 90% of the overall light power of said second light radiation incident at said each point respectively come from said two opposite half-spaces.

6. The method according to claim 1, wherein at least 75% of the overall light power of said first light radiation incident at said each point and at least 75% of the overall light power of said second light radiation incident at said each point of said surface portion forms, with a plane tangent to the surface of said tyre at said each point, a first incidence angle with amplitude smaller than or equal to 55°.

7. The method according to claim 1, wherein at least 75% of the overall light power of said first light radiation incident at said each point and at least 75% of the overall light power of said second light radiation incident at said each point of said surface portion forms, with a plane tangent to the surface of said tyre at said each point, a first incidence angle having amplitude greater than or equal to 10°.

8. The method according to claim 1, wherein at least 75% of the overall light power of said first light radiation incident at said each point and at least 75% of the overall light power of said second light radiation incident at said each point of said surface portion forms, with a reference plane orthogonal to said optical plane at said each point and passing through the perpendicular to the surface at said each point, a second incidence angle smaller than or equal to 45°, in absolute value.

9. The method according to claim 1, comprising illuminating said surface portion, at a time different from those when the surface portion is illuminated with the first and second radiation, with a third light radiation different from the first and second radiation, and acquiring a third image of said surface portion illuminated by said third light radiation, said third image being two-dimensional and said third light radiation being diffuse.

10. The method according to claim 9, further comprising processing said third image in order to detect the possible presence of defects on the surface portion, said processing using the information obtained from the aforesaid comparison between the first and second images.

11. The method according to claim 1, wherein said first and second images are digital images that are composed of a respective plurality of first and second linear images of a succession of linear surface portions, contiguous or partially superimposed on each other, said first and second linear images being acquired on each linear portion of said succession of linear portions respectively illuminated by said first and second light radiation in an alternated sequence.

12. The method according to claim 11, comprising illuminating said surface portion, at a time different from those when the surface portion is illuminated with the first and second radiation, with a third light radiation different from the first and second radiation, and acquiring a third image of said surface portion illuminated by said third light radiation, said third image being two-dimensional and said third light radiation being diffuse, wherein said third image is a digital image composed of a plurality of third linear images of said succession of linear surface portions, said third linear images being acquired on each linear portion of said succession of linear portions illuminated by said third light radiation, in a sequence alternating with said acquisition of said respective first and second linear images.

13. The method according to claim 11, wherein said succession of linear portions is obtained by rotation of the tyre around its axis.

14. The method according to claim 1, wherein before comparing the first and the second images with each other, provision is made for equalising said first and second images with respect to each other.

15. The method according to claim 1, wherein a time lag in the acquisition of two pixels belonging to each pair of corresponding pixels of the first and second images is less than 0.5 milliseconds.

16. An apparatus for checking tyres in a tyre production line comprising:
    a support for a tyre;
    a first light source and a second light source adapted to respectively emit a first and a second light radiation for illuminating substantially a same surface portion of said tyre and a detection system adapted to acquire a first and second image of substantially said surface portion illuminated respectively by said first and second light radiation, said first and second images being two-dimensional images;
    a command and control unit configured for:

alternately activating said first light source and second light source, and activating said detection system in order to acquire said first and second images synchronously with the activation of the first and second sources, respectively;

a processing unit configured for the following functions:
receiving, from the detection system, said first and second images; and processing said first and second images, wherein said first and second images are compared with each other in order to obtain information on an altimetric profile of said surface portion;

wherein:
said first light radiation and said second light radiation are grazing; and for each point of said surface portion, at least 75% of an overall light power of said first light radiation incident at said each point and at least 75% of an overall light power of said second light radiation incident at said each point respectively come from two half-spaces that are opposite with respect to an optical plane passing through the perpendicular to the surface of the tyre at said each point.

17. The apparatus according to claim 16, comprising a third light source adapted to emit a third light radiation for illuminating said surface portion, wherein said detection system is adapted to acquire a third image and wherein said command and control unit is configured for activating said third light source at a time different from those when the surface portion is illuminated with the first and second radiation, and driving said detection system in order to acquire said third image synchronously with the activation of the third source.

18. The apparatus according claim 17, wherein the apparatus comprises a system for detecting the angular position of said support, the command and control unit being configured for activating said first light source, second light source, and third light source and driving said detection system as a function of a signal of angular position of the support sent by said system for detecting the angular position of said support.

19. The apparatus according claim 16, wherein the detection system comprises a linear camera having an objective line.

20. The apparatus according claim 16, comprising a movement member adapted to rotate said support, and hence the tyre, around a rotation axis thereof, the command and control unit being configured for driving said movement member.

* * * * *